72857 W.B. Hutchinson's Well-Tubes.

PATENTED
DEC 31 1867

Witnesses
Theo Tasche
Wm. Trewin

Inventor
W. B. Hutchinson
Per Munn & Co
Attorneys

United States Patent Office.

WILLIAM B. HUTCHINSON, OF NEWBERN, NORTH CAROLINA, ASSIGNOR TO HIMSELF AND MITCHELL, ALLEN & CO., OF SAME PLACE.

Letters Patent No. 72,857, dated December 31, 1867.

IMPROVEMENT IN WELL-TUBES.

The Schedule referred to in these Letters Patent and making part of the same.

TO ALL WHOM IT MAY CONCERN:

Be it known that I, WILLIAM B. HUTCHINSON, of Newbern, in the county of Craven, and State of North Carolina, have invented a new and useful Improvement in Well-Tubes; and I do hereby declare that the following is a full, clear, and exact description thereof, which will enable others skilled in the art to make and use the same, reference being had to the accompanying drawings, and to the letters of reference marked thereon.

This invention consists in the combination of a conical-gauge strainer placed in the end of the well-tube, a pointed cylinder having a hollow perforated bead near its lower end, and an inverted conical basket within the cylinder, and provided with diamond-shaped holes, as will be hereinafter more fully described. In the accompanying plate of drawings, my improvement in well-tubes is illustrated—

Figure 1:
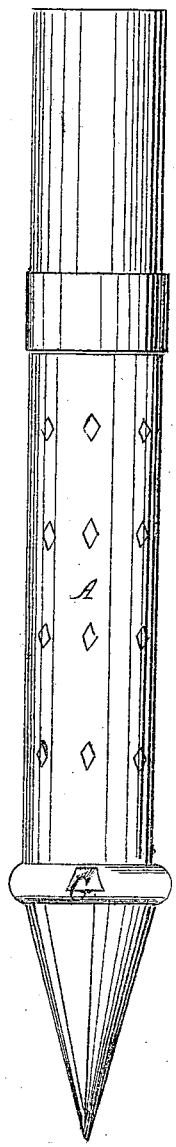

Figure 1 being a side view or elevation of the same, and

Figure 2:
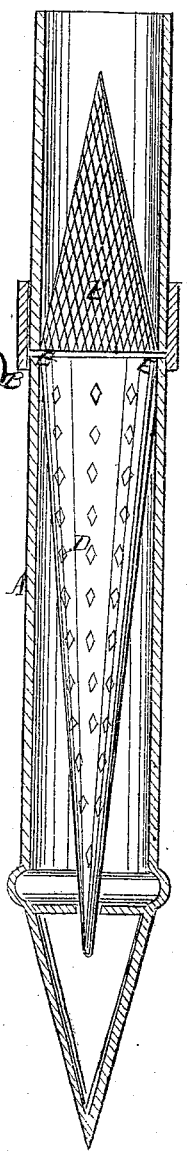

Figure 2 a central longitudinal vertical section.

A, in the drawings, represents the outside perforated pointed cylinder, cast in one piece, with a neck or shoulder at the open end, B, for allowing a thread to be cut to receive the coupling. D, the perforated sand-basket, cast separate, and with a flange, E, at its open end, to fit on the neck of the cylinder and to overlap it. F the gauze strainer or filter, fitting closely upon the neck and inside of the coupling, in a reverse position from the sand-basket, with a similar flange where it is securely clamped between the ends of the cylinder and pipe by the coupling, without the use of solder. G, two holes in the outer cylinder A, in shape of a half-moon or circle, for allowing the sand to wash out of the well, and into a reservoir created by the suction from the pump.

Having thus described my invention, I claim as new, and desire to secure by Letters Patent—

The combination of the conical-gauge strainer F, perforated inverted conical sand-basket D, and perforated pointed cylinder A, having the openings G in the hollow bead near its lower end, as herein described, for the purpose specified.

The above is a specification of the improved economical well invented by me.

Newbern, N. C., August 27, 1867.

WM. B. HUTCHINSON.

Witnesses:
W. F. STANLY,
GEO. ALLEN.